(12) United States Patent
Yu et al.

(10) Patent No.: US 11,144,791 B2
(45) Date of Patent: Oct. 12, 2021

(54) ELECTRONIC APPARATUS FOR RECOGNIZING USER AND CONTROLLING METHOD THEREOF

(71) Applicant: Samsung Electronics Co., Ltd., Suwon-si (KR)

(72) Inventors: Yongju Yu, Suwon-si (KR); Yongwook Kim, Suwon-si (KR); Dongkyu Lee, Suwon-si (KR); Kiyoung Kwon, Suwon-si (KR); Jimin Kim, Suwon-si (KR); Chulkwi Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 178 days.

(21) Appl. No.: 16/445,710

(22) Filed: Jun. 19, 2019

(65) Prior Publication Data
US 2020/0012901 A1 Jan. 9, 2020

(30) Foreign Application Priority Data
Jul. 3, 2018 (KR) .................. 10-2018-0076875

(51) Int. Cl.
*G06K 9/62* (2006.01)
*G06T 7/60* (2017.01)
(Continued)

(52) U.S. Cl.
CPC ........... *G06K 9/6269* (2013.01); *G06F 16/51* (2019.01); *G06F 16/5854* (2019.01);
(Continued)

(58) Field of Classification Search
CPC ........... G06K 9/00369; G06K 9/00771; G06K 9/6228; G06K 9/6256; G06K 9/6269;
(Continued)

(56) References Cited

U.S. PATENT DOCUMENTS 6,775,397 B1 8/2004 Haemaelaeinen
7,069,259 B2 6/2006 Horvitz et al.
(Continued)

FOREIGN PATENT DOCUMENTS

KR 10-2012-0072009 A 7/2012
KR 10-2013-0088564 A 8/2013
(Continued)

OTHER PUBLICATIONS

International Search Report dated Oct. 11, 2019, issued in an International application No. PCT/KR2019/007386.
(Continued)

*Primary Examiner* — Manuchehr Rahmjoo
(74) *Attorney, Agent, or Firm* — Jefferson IP Law, LLP

(57) ABSTRACT

An electronic apparatus for recognizing a user and a method therefor are provided. The electronic apparatus includes a communication interface, a dynamic vision sensor (DVS), a memory including a database in which one or more images are stored, and at least one processor. The at least one processor is configured to generate an image, in which a shape of an object is included, based on an event detected through the DVS, control the memory to store a plurality of images generated under a specified condition, in the database, identify shapes of the user included in each of the plurality of images stored in the database, and generate shape information for recognizing the user based on the identified shapes. The plurality of images may include a shape of a user.

20 Claims, 10 Drawing Sheets

(51) Int. Cl.
  *G06F 16/51* (2019.01)
  *G06F 16/583* (2019.01)
  *G06F 21/62* (2013.01)
  *G08B 13/196* (2006.01)
  *G08B 25/00* (2006.01)

(52) U.S. Cl.
  CPC ......... *G06K 9/6228* (2013.01); *G06K 9/6256* (2013.01); *G06T 7/60* (2013.01); *G06F 21/6245* (2013.01); *G06T 2207/10024* (2013.01); *G06T 2207/30196* (2013.01); *G08B 13/19656* (2013.01); *G08B 25/001* (2013.01)

(58) Field of Classification Search
  CPC . G06T 2207/10024; G06T 2207/30196; G06T 7/60; G08B 13/19656; G08B 25/001
  See application file for complete search history.

(56) References Cited

U.S. PATENT DOCUMENTS

| | | |
|---|---|---|
| 7,406,449 B2 | 7/2008 | Horvitz et al. |
| 7,831,529 B2 | 11/2010 | Horvitz et al. |
| 9,207,768 B2 | 12/2015 | Kang et al. |
| 9,866,507 B2 | 1/2018 | Frenkel et al. |
| 10,198,660 B2 | 2/2019 | Ji et al. |
| 2004/0002932 A1 | 1/2004 | Horvitz et al. |
| 2006/0206573 A1 | 9/2006 | Horvitz et al. |
| 2008/0130958 A1 | 6/2008 | Ziomek |
| 2009/0030857 A1 | 1/2009 | Horvitz et al. |
| 2012/0163661 A1 | 6/2012 | Lee et al. |
| 2013/0194184 A1 | 8/2013 | Kang et al. |
| 2017/0005958 A1 | 1/2017 | Frenkel et al. |
| 2017/0213105 A1 | 7/2017 | Ji et al. |
| 2018/0341835 A1* | 11/2018 | Siminoff ............... G06F 16/434 |

FOREIGN PATENT DOCUMENTS

| | | |
|---|---|---|
| KR | 10-1460902 B1 | 11/2014 |
| KR | 10-2017-0090347 A | 8/2017 |

OTHER PUBLICATIONS

Extended European Search Report dated Mar. 29, 2021, issued in a counterpart European Application No. 19829775.6.

Tareque Md. Hasan et al: "Contour Based Face Recognition Process", International Journal of Computer Science Engineering and Technology, vol. 3, No. 7, Jul. 31, 2013, pp. 244-248, XP05578637. ISSN: 2231-0711 Retrieved from the Internet: URL:https://ijcset.net/docs/Volumes/volume 3issue7/ijcset2013030702.pdf.

Dominik Schmidt et al.: "HandsDown: Hand-contour-based User Identification for Interactive Surfaces", Proceedings of the 6th Nordic Conference On Human-Computer Interaction Extending, Jul. 21, 2017, pp. 132-149, XP05578686, NL ISSN: 1574-1192, Retrieved from the Internet: URL:https://doi.org/10.1016/j.pmcj.

Qi Jun et al., "Advanced internet of things for personalised healthcare systems: A survey", Boundaries, Nordichi 10, Oct. 20, 2010, p. 432, XPO55177919, Pervasive and Mobile Computing [Online], vol. 41, Jul. 21, 2017, pp. 132-149.

* cited by examiner

ELECTRONIC APPARATUS FOR RECOGNIZING USER AND CONTROLLING METHOD THEREOF

CROSS-REFERENCE TO RELATED APPLICATION(S)

This application is based on and claims priority under 35 U.S.C. § 119(a) of a Korean patent application number 10-2018-0076875, filed on Jul. 3, 2018, in the Korean Intellectual Property Office, the disclosure of which is incorporated by reference herein its entirety.

BACKGROUND

1. Field

The disclosure relates to a technology of user recognition.

2. Description of Related Art

A user recognition technology may be used extensively for a surveillance and access control system requiring security and a smart device for providing customized services to a user, as a technology of recognizing a user by using registered user information. A user recognition device may recognize the user via a device such as an identification card, a key, or a smart card or may recognize the user via biometric recognition using a fingerprint, an iris, or the like.

An image-based user recognition device may obtain information of a face, a hand, an action, or the like of the user included in an image and may recognize the user on image captured to recognize the user, using the obtained information.

The above information is presented as background information only to assist with an understanding of the disclosure. No determination has been made, and no assertion is made, as to whether any of the above might be applicable as prior art with regard to the disclosure.

SUMMARY

An image-based user recognition device may recognize a user using a red green blue (RGB) image obtained via a frame-based vision sensor. The user recognition device may extract the features of a plurality of layers included in the whole region or a specific region of an RGB image to recognize the specific user. When a user is recognized using an RGB image, the user's privacy may be infringed by extracting the features of body such as the user's face, body, or the like. The privacy may be infringed when an RGB image including the user is transmitted to a server for accurate recognition. In the meantime, when the user recognition device recognizes the user by using an image of the shape (or contour) of an object obtained via an event-based vision sensor, the privacy problem may be solved, but it may be difficult to accurately recognize the user.

Aspects of the disclosure are to address at least the above-mentioned problems and/or disadvantages and to provide at least the advantages described below. Accordingly, an aspect of the disclosure is to provide a user recognition device according to various embodiments of the disclosure that may generate an image including the shape of an object to train the shape of the user of the generated image, and thus may accurately recognize the user.

Additional aspects will be set forth in part in the description which follows and, in part, will be apparent from the description, or may be learned by practice of the presented embodiments.

In accordance with an aspect of the disclosure, an electronic apparatus is provided. The electronic apparatus includes a communication interface, a dynamic vision sensor (DVS), a memory including a database in which one or more image is stored, and at least one processor generating an image, in which a shape of an object is included, based on an event detected through the DVS. The at least one processor may be configured to store a plurality of images generated under a specified condition, in the database, to identify shapes of the user included in each of the plurality of images stored in the database, and to generate shape information for recognizing the user based on the identified shapes. The plurality of images may include a shape of a user.

In accordance with another aspect of the disclosure, a control method of an electronic apparatus is provided. The control method includes generating an image, in which a shape of an object is included, via a DVS, storing a plurality of images generated under a specified condition, in a database, identifying shapes of the user included in each of the plurality of images stored in the database, and generating shape information for recognizing the user based on the identified shapes. The plurality of images may include a shape of a user.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications, / of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Figure 1:
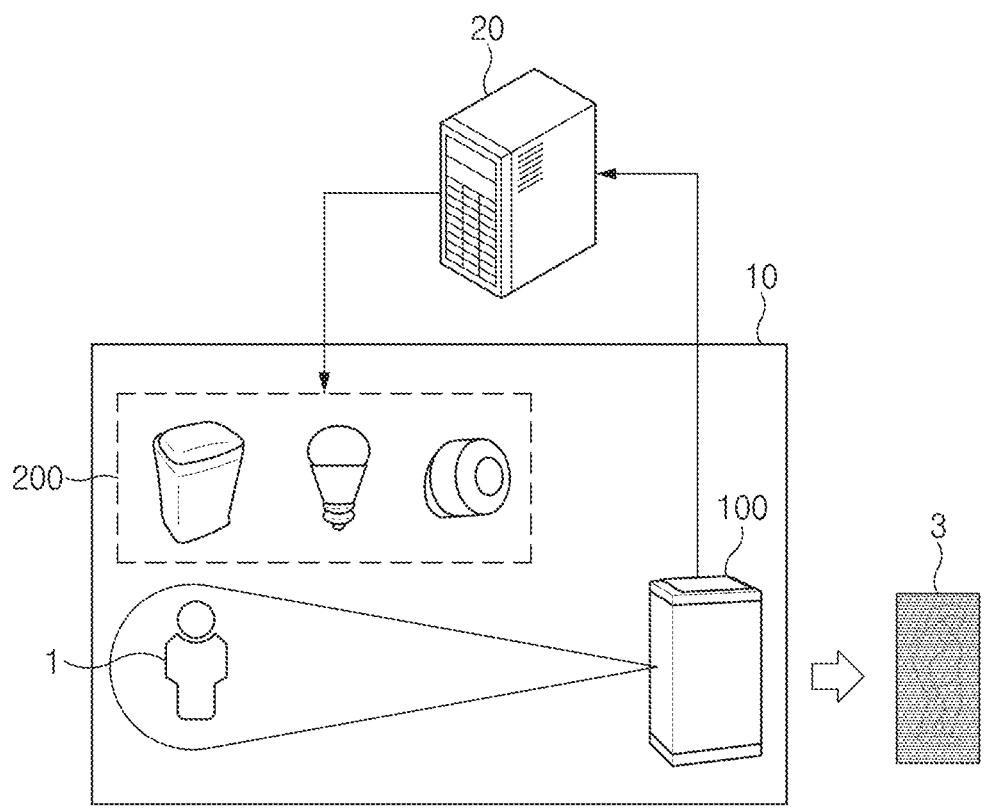
FIG. 1 is a view illustrating a user recognition system, according to an embodiment of the disclosure.

FIG. 1 is a view illustrating a user recognition system, according to an embodiment of the disclosure.

Referring to FIG. 1, a user recognition device (or electronic apparatus) 100 may recognize a user 1 at a specified location (e.g., home) 10 and may provide a specified service depending on the recognized user.

According to an embodiment, the user recognition device 100 may recognize the user 1, via a vision sensor. According to an embodiment, the user recognition device 100 may detect the user 1 via the vision sensor and may generate an image 3 in which the detected user 1 is included. According to an embodiment, the user recognition device 100 may recognize the user 1, using the generated image.

According to an embodiment, when recognizing a user, the user recognition device 100 may provide a service corresponding to the recognized user. For example, the user recognition device 100 may control an internet of thing (IoT) device 200 to have a state set by the recognized user or may control the IoT device 200 to perform a specified function. For example, the IoT device 200 may be a device installed at the location (e.g., home) 10 where the user recognition device 100 is positioned.

According to an embodiment, the user recognition device 100 may provide a specified service via a cloud server 20. For example, the user recognition device 100 may control the IOT device 200 through the cloud server 20 (e.g., an IOT cloud server). The user recognition device 100 may transmit information (or control information) for controlling the IOT device 200, to the cloud server 20. For example, the control information may include state information or operation information corresponding to the recognized user. The cloud server 20 may receive control information and may transmit a command according to the received control information, to the IoT device 200.

According to an embodiment, the user recognition device 100 may be implemented in a variety of electronic apparatuses including the vision sensor. For example, the user recognition device 100 may be a smartphone, a tablet personal computer (PC), a desktop computer, a television (TV), a wearable device, or the like including the vision sensor. According to an embodiment, the user recognition device 100 may be included in a security system or a smart home system.

When the user recognition device 100 recognizes the user 1 using the RGB image obtained via the frame-based vision sensor, the user recognition device 100 may recognize the user 1 accurately, but the privacy of the user 1 may be infringed by extracting the features of the user's face, body, and other bodies. The privacy may be infringed when an RGB image including the user is transmitted to the server. Furthermore, when the user recognition device 100 recognizes the user 1 by using an image of the shape (or contour) of an object obtained via an event-based vision sensor, the privacy problem may be solved, but it may be difficult to accurately recognize the user.

The user recognition device 100 according to various embodiments of the disclosure may generate an image including the shape of an object to train the shape of the user of the generated image, and thus may accurately recognize the user.

Figure 2:
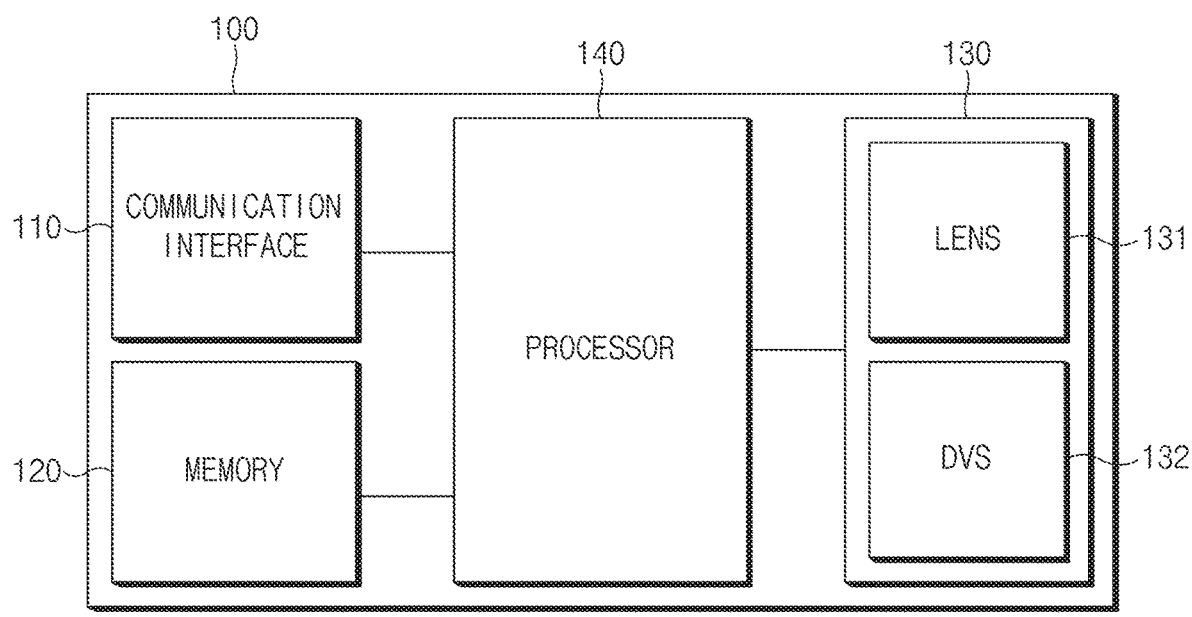
FIG. 2 is a block diagram illustrating a configuration of a user recognition device, according to an embodiment of the disclosure.

FIG. 2 is a block diagram illustrating a configuration of a user recognition device, according to an embodiment of the disclosure.

Referring to FIG. 2, the user recognition device 100 may include a communication interface 110 (e.g., a transceiver), a memory 120, a dynamic vision sense (DVS) module 130, and a processor (or at least one processor) 140.

According to an embodiment, the communication interface 110 may be connected to an external device to transmit or receive data. For example, the communication interface 110 may be connected to a cloud server (e.g., the cloud server 20 of FIG. 1) to receive data. For another example, the communication interface 110 may be connected to a user terminal to transmit or receive data. According to an embodiment, the communication interface 110 may include at least one of a wireless interface and a wired interface. For example, the wireless interface may include Bluetooth, near field communication (NFC), wireless-fidelity (Wi-Fi), or the like. The wired interface may include local area network (LAN), wide area network (WAN), power line communication, and plain old telephone service (POTS).

According to an embodiment, the memory 120 may include at least one database capable of storing data. For example, the memory 120 may include a database storing the image generated by the user recognition device 100. For example, the database may be a database in which an image for training the shape of a specified user is stored. According to an embodiment, the memory 120 may include a nonvolatile memory for storing data. For example, the memory 120 may include a read-only memory (ROM), a flash memory, a hard disk drive (HDD), or the like.

According to an embodiment, the DVS module 130 may output an event signal based on the generated event. For example, the DVS module 130 may sense the motion of an object (e.g., the user) to output an event signal. According to an embodiment, the DVS module 130 may include a lens 131 and a DVS 132.

According to an embodiment, the lens 131 may transmit the light reflected by the object to the DVS 132. For example, the lens 131 may transmit the light reflected by the object by allowing the light to enter the inside of the user recognition device 100.

According to an embodiment, the DVS 132 may detect the incident light through the lens 131 to output an event signal. According to an embodiment, the DVS 132 may include a plurality of sensing elements. Each of the plurality of sensing elements may sense the incident light to output the event signal. According to an embodiment, the DVS 132 may output the event signal from a sensing element in which light is changed. For example, a sensing element, in which the intensity of light increases, from among the plurality of sensing elements of the DVS 132 may output an on-event signal, and a sensing element in which the intensity of light decreases may output an off-event signal. According to an embodiment, the change in light detected through the DVS 132 may be caused by the motion of an object. As such, the DVS 132 may detect the motion of an object to output an event signal.

According to an embodiment, the processor 140 may receive the event signal output from the DVS module 130 and may output an image based on the received event signal.

According to an embodiment, the processor 140 may store information about a point in time when light is changed, in the event map based on the received event signal. For example, the event map may include a plurality of map elements corresponding to the plurality of sensing elements of the DVS 132. The processor 140 may store time information in a map element corresponding to an element in which light is changed, based on an event signal. According to an embodiment, the processor 140 may store information about a point in time when light has been recently changed, in an event map (e.g., a two-dimensional event map). Furthermore, the processor 140 may store not only the information about a point in time when light has been recently changed, but also information about a point in time when light was changed in the past, in an event map (e.g., a three-dimensional event map).

According to an embodiment, the processor 140 may generate an image based on the event map. For example, the processor 140 may generate an image based on time information stored in the event map. The processor 140 may generate an image by displaying a specified value in a pixel corresponding to an element of a map in which time information is stored. According to an embodiment, the processor 140 may generate an image based on time information within a specified time range among time information stored in the event map. For example, the processor 140 may generate an image based on time information within a specified time from the present.

According to an embodiment, the processor 140 may store the generated image in a database of the memory 120. For example, the processor 140 may store the image generated under the specified condition, in the database to train the shape of the specified user (or a specific user).

According to an embodiment, the processor 140 may store the generated image in the database when receiving identification information for distinguishing the user from the external electronic apparatus via the communication interface 110. For example, the external electronic apparatus may receive identification information from a key, a user terminal, or a beacon including a radio frequency integrated circuit (RFIC), to perform a specified operation. The specified operation may be an operation of setting or disabling security. This will be described in detail with reference to FIG. 4.

According to another embodiment, the processor 140 may store an image generated based on the event detected in a specified space, in a database. The processor 140 may store the generated image based on the feedback information of the user, in the database. This will be described in detail with reference to FIG. 6.

According to an embodiment, the processor 140 may train the shape of the specified user included in each of a plurality of images stored in the database of the memory 120. For example, the processor 140 may identify the shape of a specified user included in each of the plurality of images stored in the database and may generate shape information for recognizing the specified user, based on the identified shape.

According to an embodiment, the processor 140 may identify the shape of the user included in an image. For example, the processor 140 may identify the shape of the user, using a method such as regions convolutional neural network (RCNN), fast regions convolutional neural network (FRCNN), or the like.

According to an embodiment, the processor 140 may extract the feature of an image to identify the user's shape. According to an embodiment, the processor 140 may determine the suggestion region of the image generated based on the extracted feature and may refine the region of interest (ROI) capable of including the user's shape of the determined suggestion region. According to an embodiment, the processor 140 may identify the shape of the user included in the ROI, using a classification model capable of recognizing the user. For example, the processor 140 may identify the shape of the user, using a support vector machine (SVM) classifier. According to an embodiment, the processor 140 may track the shape of a user included in a plurality of images.

According to an embodiment, the processor 140 may generate shape information for recognizing the specified user based on the shape information of the identified user. For example, the processor 140 may extract feature of the identified shape and may generate shape information for recognizing the specified user based on the extracted feature.

According to an embodiment, the processor 140 may recognize the specified user using the generated shape information. For example, the processor 140 may recognize the specified user included in the image, using the generated shape information. For example, the image may be an image generated based on an event detected through the DVS module 130.

According to another embodiment, the processor 140 may generate shape information for recognizing the specified user through a cloud server (or an external server). The processor 140 may transmit the image generated to the cloud server through the communication interface 110 and may receive shape information generated from the cloud server. For example, the cloud server may similarly perform an operation in which the processor 140 generates shape information. The cloud server may generate shape information for recognizing the user by training the shape of the user included in the image generated under the specified condition. Because the user recognition device 100 has limitations in training the user's shape, the user recognition device 100 may generate more accurate shape information through the cloud server.

According to an embodiment, the processor 140 may provide a service corresponding to a recognized user. For example, the processor 140 may control at least one IoT device (e.g., the IoT device 200 of FIG. 1) based on the recognized user. For example, the processor 140 may control the at least one IoT device to have a specified state or to perform the specified operation, based on the recognized user. According to an embodiment, the processor 140 may control at least one IoT device through a cloud server (e.g., the cloud server 20 of FIG. 1).

As such, the user recognition device 100 may train the shape of a specified user, using an image including only the shape of an object, may generate shape information for recognizing a specified user, and may recognize the specified user based on the generated shape information, thereby correctly recognizing the specified user without any problem of privacy.

Figure 3:
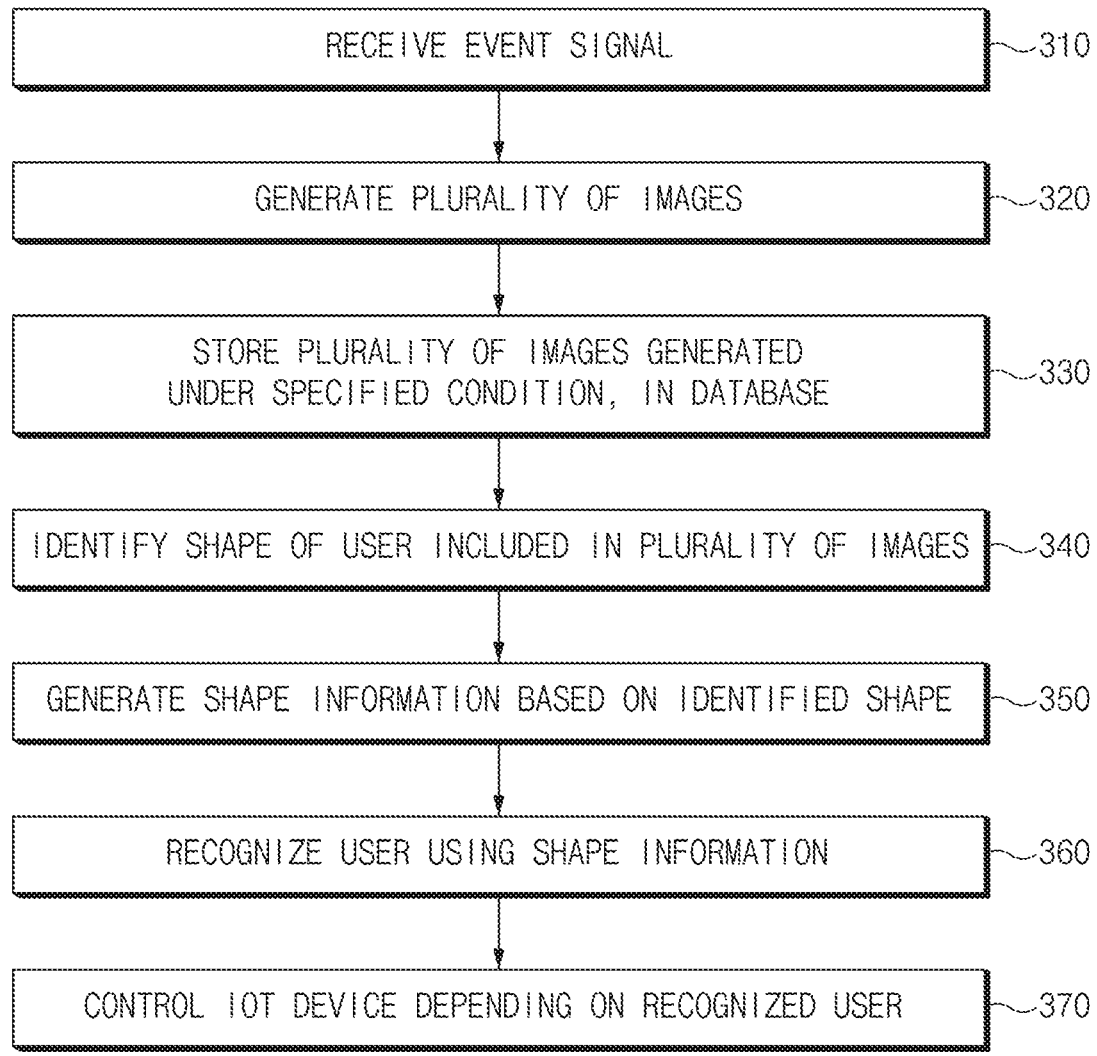
FIG. 3 is a flowchart illustrating a user recognizing method of a user recognition device, according to an embodiment of the disclosure.

FIG. 3 is a flowchart illustrating a user recognizing method of a user recognition device, according to an embodiment of the disclosure.

Referring to FIG. 3, the user recognition device 100 may recognize a specified user, using the image generated based on an event detected through the DVS module 130.

According to an embodiment, in operation 310, the user recognition device 100 (e.g., the processor 140) may receive an event signal from the DVS module 130. The DVS module 130 may generate an event signal by detecting the change in light by the motion of an object.

According to an embodiment, in operation 320, the user recognition device 100 may generate a plurality of images based on the received event signal. For example, the plurality of images may include the shape of a moving object.

According to an embodiment, in operation 330, the user recognition device 100 may store an image generated under the specified condition, in a database. For example, the specified condition may be the case where identification information for distinguishing a user is received from an external electronic apparatus (e.g., a security setting device) or the case where an event is detected in the specified space.

According to an embodiment, in operation 340, the user recognition device 100 may identify the shape of the specified user included in each of the plurality of images. For example, the user recognition device 100 may extract the features of a plurality of images and may identify the shape of the user included in the ROI determined based on the extracted features.

According to an embodiment, in operation 350, the user recognition device 100 may generate shape information for recognizing the specified user, based on the identified shape. According to an embodiment, the user recognition device 100 may generate shape information for recognizing a specified user, by training the shape of a specified user included in a plurality of images.

According to an embodiment, in operation 360, the user recognition device 100 may recognize a specified user, using the shape information. For example, the user recognition device 100 may recognize the specified user included in the image, using the generated shape information. For example, the image may be an image generated based on an event detected through the DVS module 130.

According to an embodiment, in operation 370, the user recognition device 100 may control at least one IoT device, depending on the recognized user. For example, the user recognition device 100 may control at least one IOT device through a cloud server.

Figure 4:
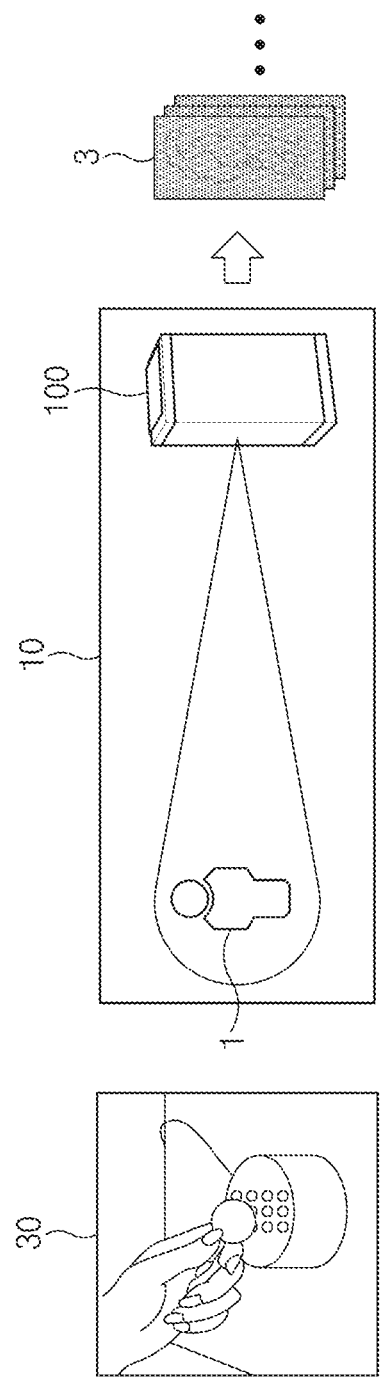
FIG. 4 is a view illustrating how a user recognition device recognizes a user, using identification information of a user received from an external device, according to an embodiment of the disclosure.

FIG. 4 is a view illustrating how a user recognition device recognizes a user, using identification information of a user received from an external device, according to an embodiment of the disclosure.

Referring to FIG. 4, the user recognition device 100 may train the shape of the specified user 1, using identification information (e.g., identity (ID)) of the user 1 received from an external electronic apparatus 30.

According to an embodiment, the external electronic apparatus 30 may receive user identification information to perform a specified operation. For example, the specified operation may be an operation for setting or disabling security at the specified location (e.g., home) 10. The external electronic apparatus 30 may be a user recognition device included in a security system. According to an embodiment, the external electronic apparatus 30 may receive identification information of the user 1 from a key, a user terminal, a beacon, or the like including an RFIC. For example, the external electronic apparatus 30 may receive the identification information by the tagging operation of the user 1.

According to an embodiment, the user recognition device 100 may receive identification information for distinguishing the user 1 from the external electronic apparatus 30. For example, when receiving a user input for performing a specified operation (e.g., setting or disabling security), the external electronic apparatus 30 may transmit the identification information included in the user input, to the user recognition device 100.

According to an embodiment, the user recognition device 100 may store the image 3 generated at a point in time when the user recognition device 100 receives the identification information from the external electronic apparatus 30, in a database. For example, the user recognition device 100 may store the plurality of images 3 generated within a specified time from a point in time when the user recognition device 100 receives the identification information, in the database. For example, the plurality of images 3 may be generated based on the event detected via a DVS module (e.g., the DVS module 130 of FIG. 2).

According to an embodiment, the user recognition device 100 may distinguish and store the images 3 generated depending on the received identification information. In other words, the user recognition device 100 may store the images 3 generated to correspond to the identification information. As such, the user recognition device 100 may distinguish and train each of a plurality of users capable of being recognized at a specified place.

According to an embodiment, when only a single user shape is included in the generated images 3, the user recognition device 100 may store the generated images 3 in the database. When the generated image 3 includes the plurality of user's shapes, it may be difficult for the user recognition device 100 to distinguish the shape of the user corresponding to the received identification information, and thus the user recognition device 100 may store an image including only a single user shape, in the database.

As such, the user recognition device 100 may store the images 3 including the shape of a specified user (or specific user), in the database.

According to an embodiment, the user recognition device 100 may train the shape of the specified user 1 included in each of a plurality of images stored in the database. According to an embodiment, the user recognition device 100 may generate shape information capable of recognizing the specified user 1, based on the trained information (or data). As such, the user recognition device 100 may recognize the specified user 1 with a high probability, using the generated shape information.

Figure 5:
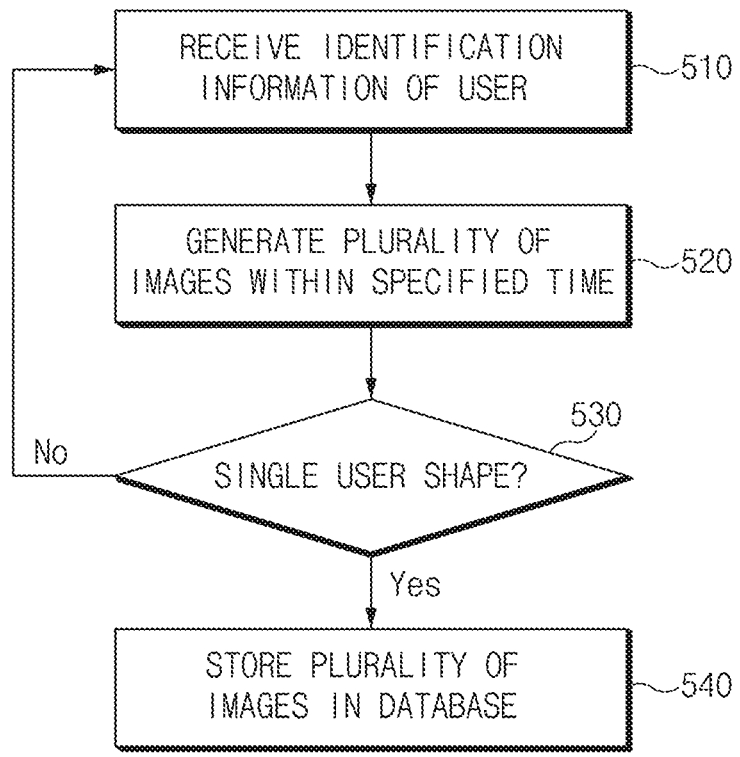
FIG. 5 is a flowchart illustrating a method of training a shape of a user included in an image, using identification information of a user received from an external device, according to an embodiment of the disclosure.

FIG. 5 is a flowchart illustrating a method of training a shape of a user included in an image, using identification information of a user received from an external device, according to an embodiment of the disclosure.

According to an embodiment, in operation 510, the user recognition device 100 may receive identification information of the user 1 from the external electronic apparatus 30.

According to an embodiment, in operation 520, the user recognition device 100 may generate the plurality of images 3 within a specified time from a point in time when the user recognition device 100 receives the identification information.

According to an embodiment, in operation 530, the user recognition device 100 may determine whether each of the generated plurality of images 3 includes a single user shape. According to an embodiment, when two or more shapes of a user are included in each of the plurality of images 3 (No), in operation 510, the user recognition device 100 may stand by to receive the identification information of the user 1.

According to an embodiment, when the single shape of a user is included in each of the plurality of images 3 (Yes), in operation 540, the user recognition device 100 may store the plurality of images 3 in the database.

As such, the user recognition device 100 may generate shape information for recognizing the specified user 1 by training the shape of the user included in the image stored in the database. The user recognition device 100 may recognize the specified user 1, using the shape information.

Figure 6:
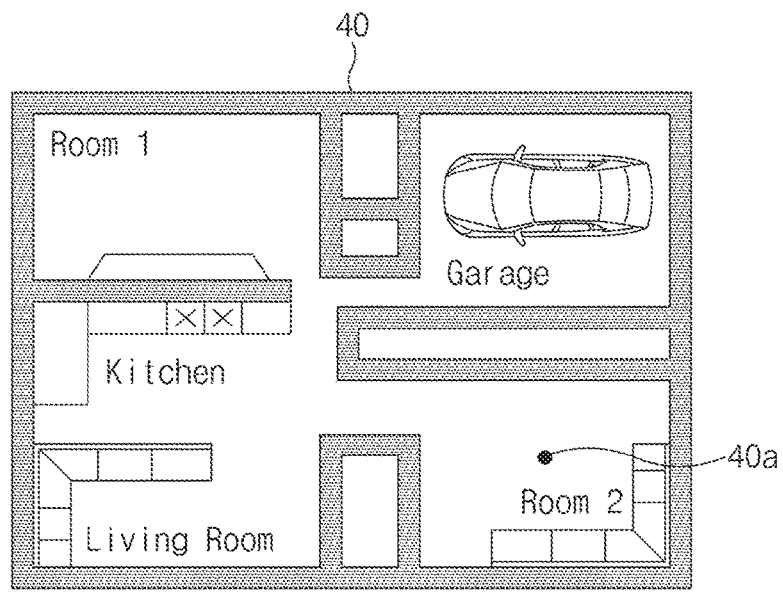
FIG. 6 is a view illustrating how a user recognition device recognizes a user based on an event detected in a specified space, according to an embodiment of the disclosure.
Figure 6:
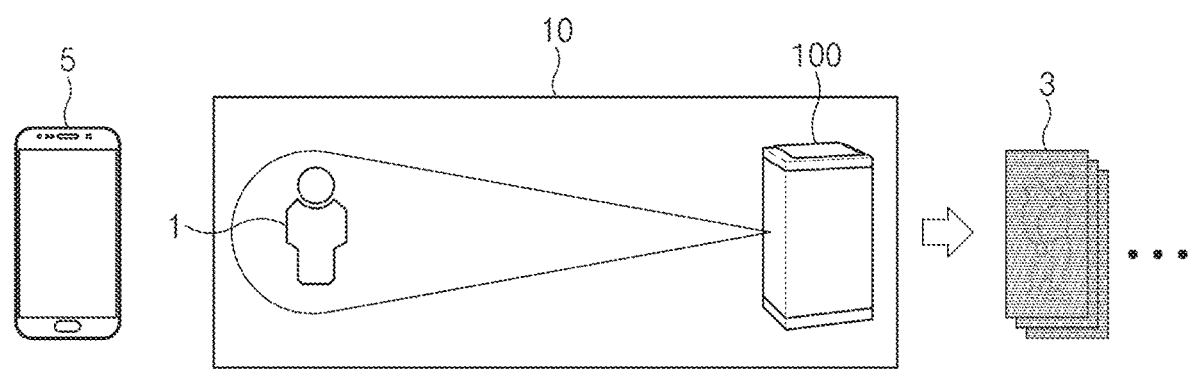

FIG. 6 is a view illustrating how a user recognition device recognizes a user based on an event detected in a specified space, according to an embodiment of the disclosure.

Referring to FIG. 6, the user recognition device 100 may generate the image 3 based on the detected event in the specified space and may train the shape of the specified user, using the generated images 3.

According to an embodiment, the user recognition device 100 may detect an event occurring in a specified space (or a specific space). For example, an event occurring in a space of a high frequency at which a specified user (or a specific user) appears may be detected in the specified space. For example, the user recognition device 100 may detect an event occurring in a second room 40a of a house 40. The second room 40a of the house 40 may correspond to a personal space of a specified user. Because the other space (e.g., a living room, a kitchen, or a garage) of the house 40 may correspond to a shared space of a plurality of users, it may be difficult for the user recognition device 100 to generate an image including only the shape of the specified user.

According to an embodiment, the user recognition device 100 may generate the plurality of images 3 based on the event occurring in the specified space.

According to an embodiment, the user recognition device 100 may transmit the generated plurality of images 3 to a user terminal 5. For example, when the shape of the user 1 is included in the plurality of images 3 more than the specified number of times, the user recognition device 100 may transmit the plurality of images 3 to the user terminal 5.

According to an embodiment, the user terminal 5 may receive a feedback for determining whether the shape of the specified user (e.g., a user of the user terminal 5) 1 is included in the received plurality of images 3. According to an embodiment, the user terminal 5 may transmit information (or feedback information) about the received feedback, to the user recognition device 100.

According to an embodiment, the user recognition device 100 may store the plurality of images 3 in a database based on the received feedback information. For example, when receiving the feedback information for determining that the plurality of images 3 include the specified user (e.g., a user of the user terminal 5) 1, the user recognition device 100 may store the plurality of images 3 in the database.

As such, the user recognition device 100 may store the images 3 including the shape of a specified user (or specific user), in the database.

According to an embodiment, the user recognition device 100 may train the shape of the specified user 1 included in the plurality of images stored in the database. According to an embodiment, the user recognition device 100 may generate shape information capable of recognizing the specified user 1, based on the trained information (or data). As such, the user recognition device 100 may recognize the specified user 1 with a high probability, using the generated shape information.

Figure 7:
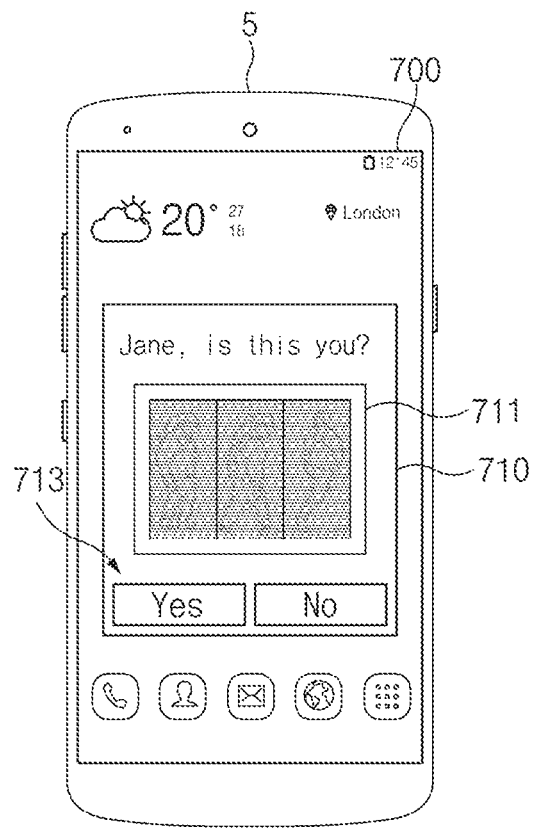
FIG. 7 is a view illustrating a user terminal displaying an image received from a user recognition device to receive feedback information, according to an embodiment of the disclosure.

FIG. 7 is a view illustrating a user terminal displaying an image received from a user recognition device to receive feedback information, according to an embodiment of the disclosure.

Referring to FIG. 7, the user terminal 5 may provide a user with a plurality of images 711 received from the user recognition device 100 and may receive feedback information for determining whether the shape of the user is included in the plurality of images 711.

According to an embodiment, the user terminal 5 may execute an application program for receiving the feedback input of the user. According to an embodiment, the user terminal 5 may display a user interface (UI) 710 for receiving a user input, in a display 700. The user terminal 5 may display the received plurality of images 711 via the UI 710 and may receive the feedback information of the user via an object (e.g., a virtual button) 713.

Figure 8:
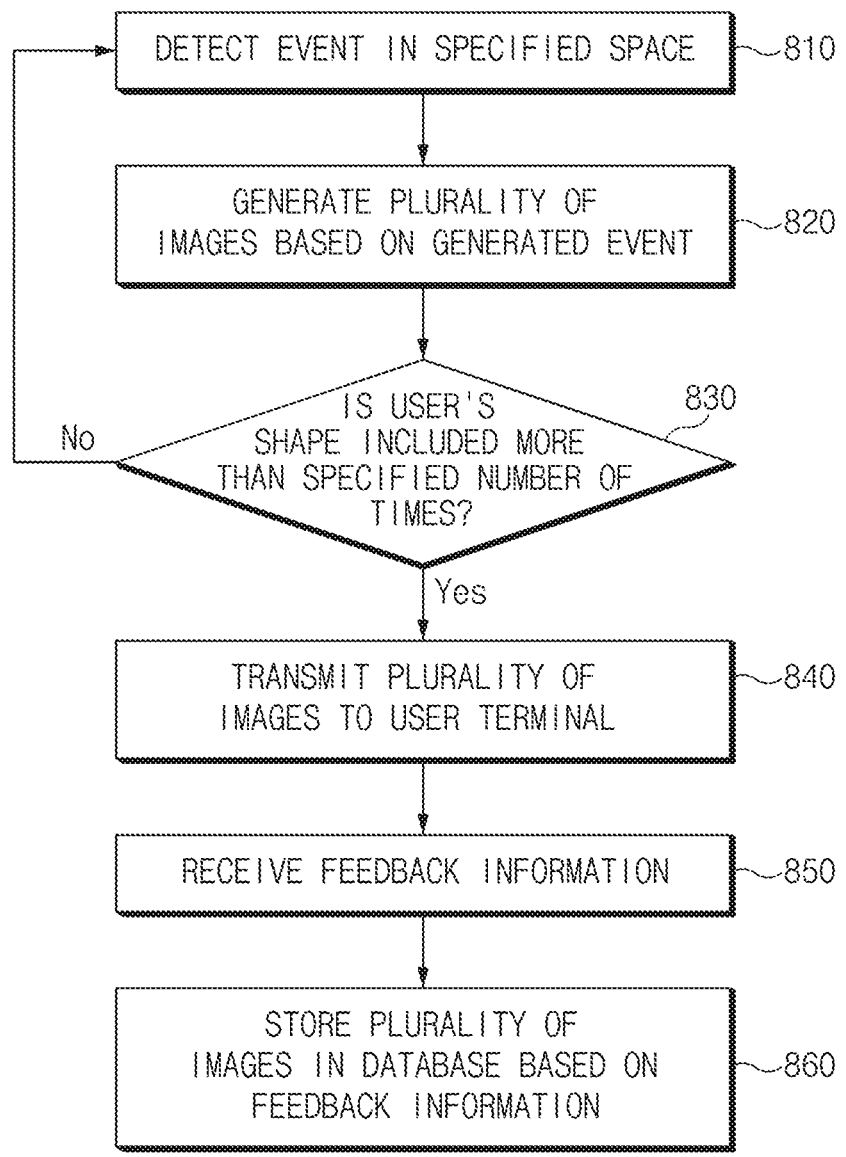
FIG. 8 is a flowchart illustrating a method of training a shape of a user based on an event detected in a specified space, according to an embodiment of the disclosure.

FIG. 8 is a flowchart illustrating a method of training a shape of a user based on an event detected in a specified space, according to an embodiment of the disclosure.

Referring to FIG. 8, in operation 810, the user recognition device 100 may detect an event occurring in a specified space.

According to an embodiment, in operation 820, the user recognition device 100 may generate the plurality of images 3 based on the event detected in the specified space.

According to an embodiment, in operation 830, the user recognition device 100 may determine whether the user's shape is included in the plurality of images 3 more than the specified number of times. According to an embodiment, when the user's shape is included in the plurality of images 3 less than the specified number of times (No), in operation 810, the user recognition device 100 may stand by to detect an event occurring in a specified space of the user 1.

According to an embodiment, when the user's shape is included in the plurality of images 3 more than the specified number of times (Yes), in operation 840, the user recognition device 100 may transmit the plurality of images 3 to the user terminal 5.

According to an embodiment, in operation 850, the user recognition device 100 may receive feedback information for determining whether the shape of the specified user 1 is included in the plurality of images 3, from the user terminal 5. For example, the specified user 1 may be a user of the user terminal 5.

According to an embodiment, in operation 860, the user recognition device 100 may store the plurality of images 3 in a database based on the received feedback information.

As such, the user recognition device 100 may generate shape information for recognizing the specified user 1 by training the shape of the user 1 included in the image stored in the database. The user recognition device 100 may recognize the specified user 1, using the shape information.

Figure 9:
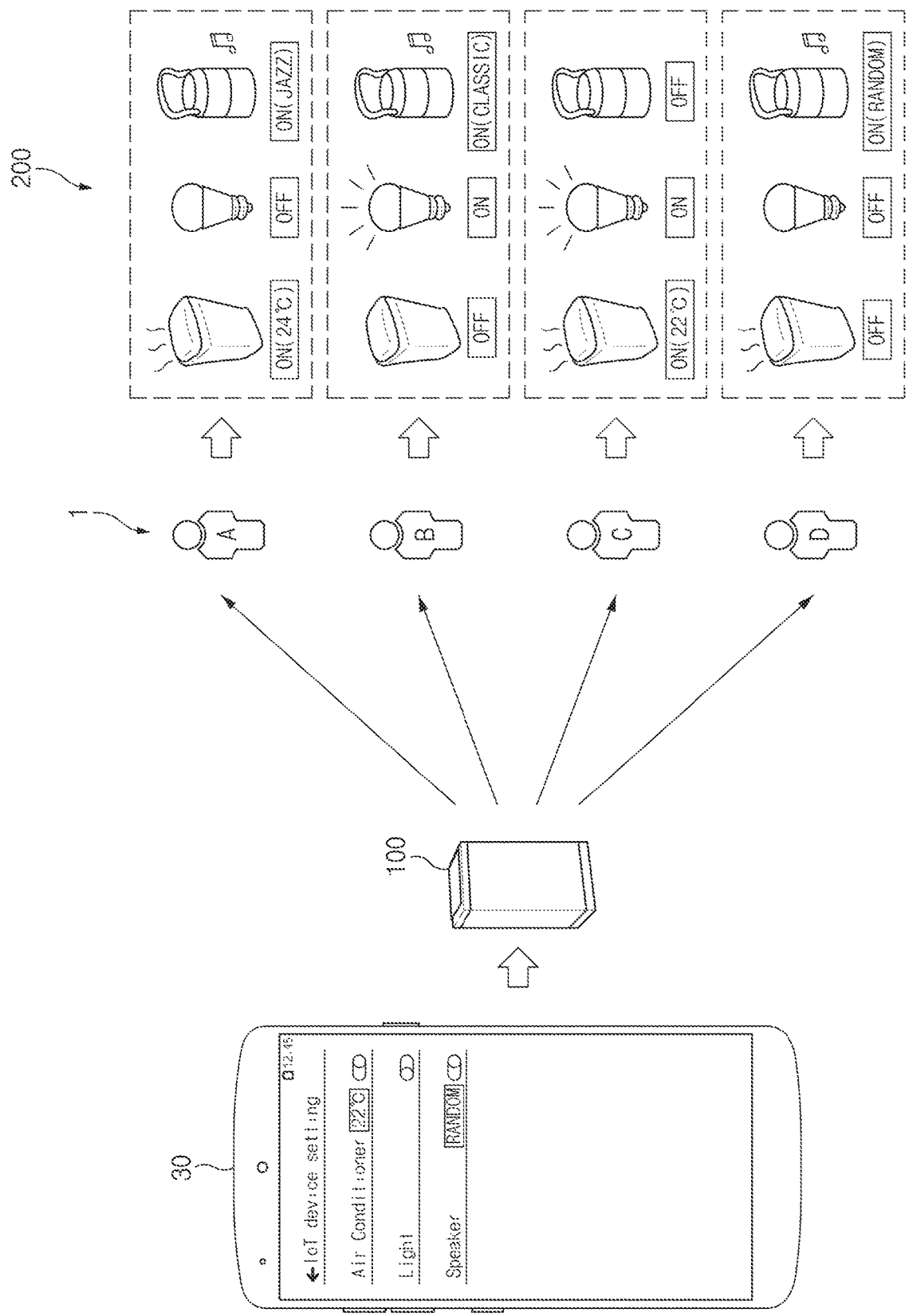
FIG. 9 is a view illustrating how a user recognition device controls an internet of thing (IoT) depending on the recognized user, according to an embodiment of the disclosure.

FIG. 9 is a view illustrating how a user recognition device controls an IoT depending on the recognized user, according to an embodiment of the disclosure.

Referring to FIG. 9, when recognizing the user 1 in the specified group, the user recognition device 100 may control the IoT device 200 differently depending on the recognized user 1.

According to an embodiment, the user recognition device 100 may be configured to control the IoT device 200 differently for the respective user 1 in the specified group. For example, the specified group may be a group of users (e.g., family (users A to D)) capable of being recognized in a specified space. According to an embodiment, a user defined rule may be stored in the user recognition device 100 (e.g., the memory 120) to control the IoT device 200 differently for the respective user 1. For example, the user defined rule not only may control power (ON/OFF) of the IoT device 200, but also may store a setting value for operating in a specified state (e.g., set temperature, playing music genre, or the like).

According to an embodiment, the user 1 may store the user defined rule in the user recognition device 100 via a user terminal 30. For example, the user terminal 30 may display a UI for setting the state of the IoT device 200 on the display and may receive a user input (e.g., a touch input) for setting a rule for controlling the IOT device 200.

According to an embodiment, the user recognition device 100 may control the IoT device 200 depending on the rule (user defined rule) defined for the respective user 1, for each recognized user. For example, when recognizing user A, the user recognition device 100 may allow an air conditioner to operate in a state where the air conditioner is set to 24° C., may allow a light lamp in a specified space to be turned off, and may allow a speaker to play jazz music, depending on the first user defined rule. When recognizing user B, the user recognition device 100 may allow the air conditioner to be turned off, may allow the light lamp in the specified space to be turned on, and may allow the speaker to play classic music, depending on the second user defined rule. For example, when recognizing user C, the user recognition device 100 may allow the air conditioner to operate in a state where the air conditioner is set to 22° C., may allow the light lamp in the specified space to be turned on, and may allow a speaker to be turned off, depending on the third user defined rule. When recognizing user D, the user recognition device 100 may allow the air conditioner to be turned off, may allow the light lamp in the specified space to be turned off, and may allow the speaker to play random music, depending on the fourth user defined rule.

As such, the user recognition device 100 may provide a service suitable for the user's preference, by controlling the IoT device 200 depending on the user 1 in the specified group.

Figure 10:
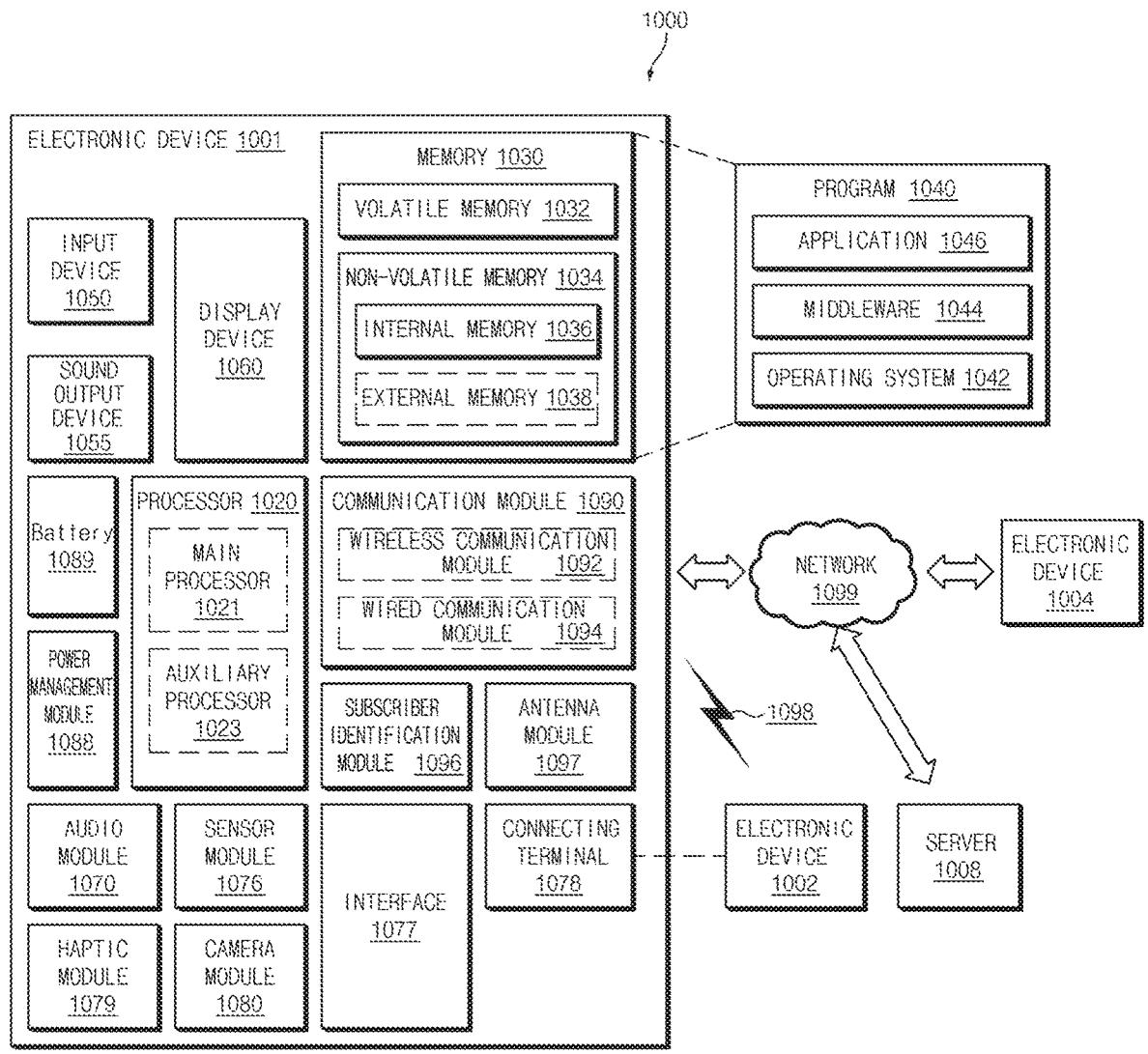
FIG. 10 illustrates a block diagram of an electronic device in a network environment according to an embodiment of the disclosure.

FIG. 10 is a block diagram of an electronic device in a network environment according to an embodiment of the disclosure.

Referring to FIG. 10, an electronic device 1001 may communicate with an electronic device 1002 through a first network 1098 (e.g., a short-range wireless communication) or may communicate with an electronic device 1004 or a server 1008 through a second network 1099 (e.g., a long-distance wireless communication) in a network environment 1000. According to an embodiment, the electronic device 1001 may communicate with the electronic device 1004 through the server 1008. According to an embodiment, the electronic device 1001 may include a processor 1020, a memory 1030, an input device 1050, a sound output device 1055, a display device 1060, an audio module 1070, a sensor module 1076, an interface 1077, a haptic module 1079, a camera module 1080, a power management module 1088, a battery 1089, a communication module 1090, a subscriber identification module 1096, and an antenna module 1097. According to some embodiments, at least one (e.g., the display device 1060 or the camera module 1080) among components of the electronic device 1001 may be omitted or other components may be added to the electronic device 1001. According to some embodiments, some components may be integrated and implemented as in the case of the sensor module 1076 (e.g., a fingerprint sensor, an iris sensor, or an illuminance sensor) embedded in the display device 1060 (e.g., a display).

The processor 1020 may operate, for example, software (e.g., a program 1040) to control at least one of other components (e.g., a hardware or software component) of the electronic device 1001 connected to the processor 1020 and may process and compute a variety of data. The processor 1020 may load a command set or data, which is received from other components (e.g., the sensor module 1076 or the communication module 1090), into a volatile memory 1032, may process the loaded command or data, and may store result data into a nonvolatile memory 1034. According to an embodiment, the processor 1020 may include a main processor 1021 (e.g., a central processing unit or an application processor) and an auxiliary processor 1023 (e.g., a graphic processing device, an image signal processor, a sensor hub processor, or a communication processor), which operates independently from the main processor 1021, additionally or alternatively uses less power than the main processor 1021, or is specified to a designated function. In this case, the auxiliary processor 1023 may operate separately from the main processor 1021 or embedded.

In this case, the auxiliary processor 1023 may control, for example, at least some of functions or states associated with at least one component (e.g., the display device 1060, the sensor module 1076, or the communication module 1090) among the components of the electronic device 1001 instead of the main processor 1021 while the main processor 1021 is in an inactive (e.g., sleep) state or together with the main processor 1021 while the main processor 1021 is in an active (e.g., an application execution) state. According to an embodiment, the auxiliary processor 1023 (e.g., the image signal processor or the communication processor) may be implemented as a part of another component (e.g., the camera module 1080 or the communication module 1090) that is functionally related to the auxiliary processor 1023. The memory 1030 may store a variety of data used by at least one component (e.g., the processor 1020 or the sensor module 1076) of the electronic device 1001, for example, software (e.g., the program 1040) and input data or output data with respect to commands associated with the software.

The memory 1030 may include the volatile memory 1032 or the nonvolatile memory 1034.

The program 1040 may be stored in the memory 1030 as software and may include, for example, an operating system 1042, a middleware 1044, or an application 1046.

The input device 1050 may be a device for receiving a command or data, which is used for a component (e.g., the processor 1020) of the electronic device 1001, from an outside (e.g., a user) of the electronic device 1001 and may include, for example, a microphone, a mouse, or a keyboard.

The sound output device 1055 may be a device for outputting a sound signal to the outside of the electronic device 1001 and may include, for example, a speaker used for general purposes, such as multimedia play or recordings play, and a receiver used only for receiving calls. According to an embodiment, the receiver and the speaker may be either integrally or separately implemented.

The display device 1060 may be a device for visually presenting information to the user of the electronic device 1001 and may include, for example, a display, a hologram device, or a projector and a control circuit for controlling a corresponding device. According to an embodiment, the display device 1060 may include a touch circuitry or a pressure sensor for measuring an intensity of pressure on the touch.

The audio module 1070 may convert a sound and an electrical signal in dual directions. According to an embodiment, the audio module 1070 may obtain the sound through the input device 1050 or may output the sound through an external electronic device (e.g., the electronic device 1002 (e.g., a speaker or a headphone)) wired or wirelessly connected to the sound output device 1055 or the electronic device 1001.

The sensor module 1076 may generate an electrical signal or a data value corresponding to an operating state (e.g., power or temperature) inside or an environmental state outside the electronic device 1001. The sensor module 1076 may include, for example, a gesture sensor, a gyro sensor, a barometric pressure sensor, a magnetic sensor, an acceleration sensor, a grip sensor, a proximity sensor, a color sensor, an infrared sensor, a biometric sensor, a temperature sensor, a humidity sensor, or an illuminance sensor.

The interface 1077 may support a designated protocol wired or wirelessly connected to the external electronic device (e.g., the electronic device 1002). According to an embodiment, the interface 1077 may include, for example, an HDMI (high-definition multimedia interface), a USB (universal serial bus) interface, an SD card interface, or an audio interface.

A connecting terminal 1078 may include a connector that physically connects the electronic device 1001 to the external electronic device (e.g., the electronic device 1002), for example, an HDMI connector, a USB connector, an SD card connector, or an audio connector (e.g., a headphone connector).

The haptic module 1079 may convert an electrical signal to a mechanical stimulation (e.g., vibration or movement) or an electrical stimulation perceived by the user through tactile or kinesthetic sensations. The haptic module 1079 may include, for example, a motor, a piezoelectric element, or an electric stimulator.

The camera module 1080 may shoot a still image or a video image. According to an embodiment, the camera module 1080 may include, for example, at least one lens, an image sensor, an image signal processor, or a flash.

The power management module 1088 may be a module for managing power supplied to the electronic device 1001 and may serve as at least a part of a power management integrated circuit (PMIC).

The battery 1089 may be a device for supplying power to at least one component of the electronic device 1001 and may include, for example, a non-rechargeable (primary) battery, a rechargeable (secondary) battery, or a fuel cell.

The communication module 1090 may establish a wired or wireless communication channel between the electronic device 1001 and the external electronic device (e.g., the electronic device 1002, the electronic device 1004, or the server 1008) and support communication execution through the established communication channel. The communication module 1090 may include at least one communication processor operating independently from the processor 1020 (e.g., the application processor) and supporting the wired communication or the wireless communication. According to an embodiment, the communication module 1090 may include a wireless communication module 1092 (e.g., a cellular communication module, a short-range wireless communication module, or a GNSS (global navigation satellite system) communication module) or a wired communication module 1094 (e.g., an LAN (local area network) communication module or a power line communication module) and may communicate with the external electronic device using a corresponding communication module among them through the first network 1098 (e.g., the short-range communication network such as a Bluetooth, a WiFi direct, or an IrDA (infrared data association)) or the second network 1099 (e.g., the long-distance wireless communication network such as a cellular network, an internet, or a computer network (e.g., LAN or WAN)). The above-mentioned various communication modules 1090 may be implemented into one chip or into separate chips, respectively.

According to an embodiment, the wireless communication module 1092 may identify and authenticate the electronic device 1001 using user information stored in the subscriber identification module 1096 in the communication network.

The antenna module 1097 may include one or more antennas to transmit or receive the signal or power to or from an external source. According to an embodiment, the communication module 1090 (e.g., the wireless communication module 1092) may transmit or receive the signal to or from the external electronic device through the antenna suitable for the communication method.

Some components among the components may be connected to each other through a communication method (e.g., a bus, a GPIO (general purpose input/output), an SPI (serial peripheral interface), or an MIPI (mobile industry processor interface)) used between peripheral devices to exchange signals (e.g., a command or data) with each other.

According to an embodiment, the command or data may be transmitted or received between the electronic device 1001 and the external electronic device 1004 through the server 1008 connected to the second network 1099. Each of the electronic devices 1002 and 1004 may be the same or different types as or from the electronic device 1001. According to an embodiment, all or some of the operations performed by the electronic device 1001 may be performed by another electronic device or a plurality of external electronic devices. When the electronic device 1001 performs some functions or services automatically or by request, the electronic device 1001 may request the external electronic device to perform at least some of the functions related to the functions or services, in addition to or instead of performing the functions or services by itself. The external electronic device receiving the request may carry out the requested function or the additional function and transmit the result to the electronic device 1001. The electronic device 1001 may provide the requested functions or services based on the received result as is or after additionally processing the received result. To this end, for example, a cloud computing, distributed computing, or client-server computing technology may be used.

The electronic device according to various embodiments disclosed in the present disclosure may be various types of devices. The electronic device may include, for example, at least one of a portable communication device (e.g., a smartphone), a computer device, a portable multimedia device, a mobile medical appliance, a camera, a wearable device, or a home appliance. The electronic device according to an embodiment of the present disclosure should not be limited to the above-mentioned devices.

It should be understood that various embodiments of the present disclosure and terms used in the embodiments do not intend to limit technologies disclosed in the present disclosure to the particular forms disclosed herein; rather, the present disclosure should be construed to cover various modifications, equivalents, and/or alternatives of embodiments of the present disclosure. With regard to description of drawings, similar components may be assigned with similar reference numerals. As used herein, singular forms may include plural forms as well unless the context clearly indicates otherwise. In the present disclosure disclosed herein, the expressions "A or B", "at least one of A or/and B", "A, B, or C" or "one or more of A, B, or/and C", and the like used herein may include any and all combinations of one or more of the associated listed items. The expressions "a first", "a second", "the first", or "the second", used in herein, may refer to various components regardless of the order and/or the importance, but do not limit the corresponding components. The above expressions are used merely for the purpose of distinguishing a component from the other components. It should be understood that when a component (e.g., a first component) is referred to as being (operatively or communicatively) "connected," or "coupled," to another component (e.g., a second component), it may be directly connected or coupled directly to the other component or any other component (e.g., a third component) may be interposed between them.

The term "module" used herein may represent, for example, a unit including one or more combinations of hardware, software and firmware. The term "module" may be interchangeably used with the terms "logic", "logical block", "part" and "circuit". The "module" may be a minimum unit of an integrated part or may be a part thereof. The "module" may be a minimum unit for performing one or more functions or a part thereof. For example, the "module" may include an application-specific integrated circuit (ASIC).

Various embodiments of the present disclosure may be implemented by software (e.g., the program 1040) including an instruction stored in a machine-readable storage media (e.g., an internal memory 1036 or an external memory 1038) readable by a machine (e.g., a computer). The machine may be a device that calls the instruction from the machine-readable storage media and operates depending on the called instruction and may include the electronic device (e.g., the electronic device 1001). When the instruction is executed by the processor (e.g., the processor 1020), the processor may perform a function corresponding to the instruction directly or using other components under the control of the processor. The instruction may include a code generated or executed by a compiler or an interpreter. The machine-readable storage media may be provided in the form of non-transitory storage media. Here, the term "non-transitory", as used herein, is a limitation of the medium itself (i.e., tangible, not a signal) as opposed to a limitation on data storage persistency.

According to an embodiment, the method according to various embodiments disclosed in the present disclosure may be provided as a part of a computer program product. The computer program product may be traded between a seller and a buyer as a product. The computer program product may be distributed in the form of machine-readable storage medium (e.g., a compact disc read only memory (CD-ROM)) or may be distributed only through an application store (e.g., a Play Store™). In the case of online distribution, at least a portion of the computer program product may be temporarily stored or generated in a storage medium such as a memory of a manufacturer's server, an application store's server, or a relay server.

Each component (e.g., the module or the program) according to various embodiments may include at least one of the above components, and a portion of the above sub-components may be omitted, or additional other sub-components may be further included. Alternatively or additionally, some components (e.g., the module or the program) may be integrated in one component and may perform the same or similar functions performed by each corresponding component prior to the integration. Operations performed by a module, a programming, or other components according to various embodiments of the present disclosure may be executed sequentially, in parallel, repeatedly, or in a heuristic method. Also, at least some operations may be executed in different sequences, omitted, or other operations may be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

According to various embodiments of the disclosure, a user recognition device may train the shape of a specified user, using an image including only the shape of an object, may generate shape information for recognizing a specified user based on the trained information, and may recognize the specified user based on the generated shape information, thereby correctly recognizing the specified user without any problem of privacy.

Besides, a variety of effects directly or indirectly understood through this disclosure may be provided.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:
1. An electronic apparatus comprising:
a communication interface;
a dynamic vision sensor (DVS) comprising a plurality of sensing elements;
a memory including a database in which one or more images are stored; and at least one processor configured to:
generate an event signal when a sensing element of the plurality of sensing elements detects a change in a light intensity,
store information about a point in time when the change in the light intensity occurred in an event map based on the generated event signal as a time information, wherein the event map includes a plurality of map elements corresponding to the plurality of sensing elements,
generate an image, in which a shape of an object is included, la displaying a specified value in pixels corresponding to each of the plurality of map elements, based on the time information which is stored in the event map,
store a plurality of images generated under a specified condition, in the database, the plurality of images including a shape of a user,
identify shapes of the user included in each of the plurality of images stored in the database, and
generate shape information for recognizing the user based on the identified shapes.

2. The electronic apparatus of claim 1, wherein the at least one processor is further configured to:
extract features of the identified shapes of the user; and
generate the shape information based on the extracted features of the shapes.

3. The electronic apparatus of claim 1, wherein the at least one processor is further configured to:
receive identification information for distinguishing the user, from an external electronic apparatus via the communication interface; and
store the plurality of images generated within a specified time from a point in time when the identification information is received, in the database.

4. The electronic apparatus of claim 3, wherein the at least one processor is further configured to:
when only a shape of the user is included in each of the plurality of images, store the plurality of images in the database.

5. The electronic apparatus of claim 4, wherein the external electronic apparatus receives the identification information from a key, a user terminal, or a beacon including a radio frequency integrated circuit (RFIC) and performs a specified operation in response to the received identification information.

6. The electronic apparatus of claim 5, wherein the specified operation is an operation of setting or disabling security.

7. The electronic apparatus of claim 1, wherein the at least one processor is further configured to:
generate the plurality of images based on an event detected in a specified space via the DVS;
transmit the plurality of images to a user terminal via the communication interface;
receive feedback information for determining whether the shape of the user is stored in the plurality of images, from the user terminal via the communication interface; and
store the plurality of images in the database based on the feedback information.

8. The electronic apparatus of claim 1, wherein the at least one processor is further configured to:
when the shape of the user is stored in the plurality of images more than a specified number of times, transmit the plurality of images to a user terminal.

9. The electronic apparatus of claim 1, wherein the at least one processor is further configured to:
recognize the user by identifying the shape of the user included in the generated image, via the DVS based on the generated shape information.

10. The electronic apparatus of claim 1, wherein the at least one processor is further configured to:
provide a service corresponding to the recognized user.

11. The electronic apparatus of claim 10, wherein the at least one processor is further configured to:
control at least one internet of things (IoT) device depending on the recognized user.

12. The electronic apparatus of claim 1, wherein the at least one processor is further configured to:
process the plurality of images via an external server to obtain the shape information.

13. A control method of an electronic apparatus, the method comprising:
generating an event signal when a sensing element of a plurality of sensing elements within a dynamic vision sensor (DVS) detects a change in a light intensity;
storing information about a point in time when the change in the light intensity occurred in an event map based on the generated event signal as a time information, wherein the event map includes a plurality of map elements corresponding to the plurality of sensing elements;
generating an image, in which a shape of an object is included, by displaying a specified value in pixels corresponding to each of the plurality of map elements, based on the time information which is stored in the event map;
storing a plurality of images generated under a specified condition, in a database, wherein the plurality of images include a shape of a user;
identifying shapes of the user included in each of the plurality of images stored in the database; and
generating shape information for recognizing the user based on the identified shapes.

14. The method of claim 13, wherein the generating of the shape information includes:
extracting features of the identified shapes of the user; and
generating the shape information based on the extracted features of the shapes.

15. The method of claim 13, further comprising:
receiving identification information for distinguishing the user, from an external electronic apparatus via a communication interface,
wherein the storing of the plurality of images in the database includes:
storing the plurality of images generated within a specified time from a point in time when the identification information is received, in the database.

16. The method of claim 15, wherein the storing of the plurality of images in the database includes:
when only a shape of the user is included in each of the plurality of images, storing the plurality of images in the database.

17. The method of claim 15, wherein the external electronic apparatus receives the identification information from a key, a user terminal, or a beacon including an RFIC and performs a specified operation in response to the received identification information.

18. The method of claim 13, wherein the generating of the image includes:
generating the plurality of images based on an event detected in a specified space via the DVS;

transmitting the plurality of images to a user terminal via the communication interface;

receiving feedback information for determining whether the shape of the user is included in the plurality of images, from the user terminal via the communication interface; and storing the plurality of images in the database based on the feedback information.

19. The method of claim 18, wherein the transmitting of the plurality of images to the user terminal includes:

when the shape of the user is included in the plurality of images more than a specified number of times, transmitting the plurality of images to the user terminal.

20. The method of claim 13, further comprising:

recognizing the user by identifying the shape of the user included in the generated image, via the DVS based on the generated shape information.

* * * * *